Nov. 5, 1929.   M. BELLER ET AL   1,734,070
SPEED INDICATING MECHANISM
Filed Jan. 25, 1928
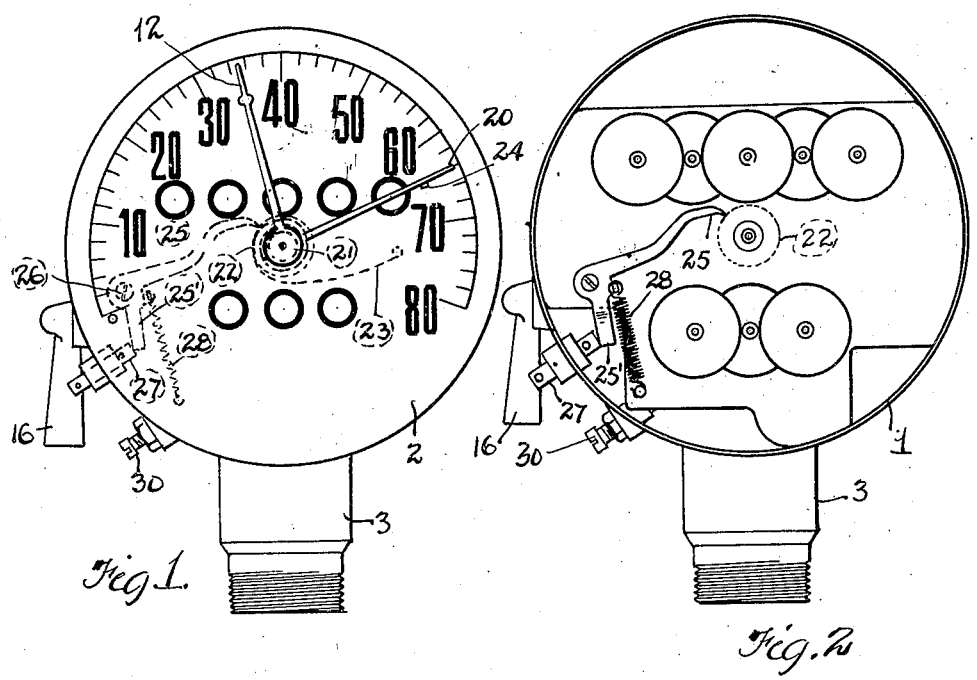
Fig. 1.
Fig. 2.
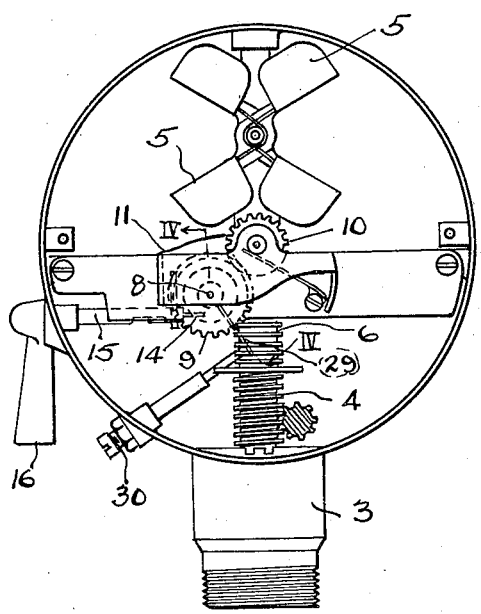
Fig. 3.
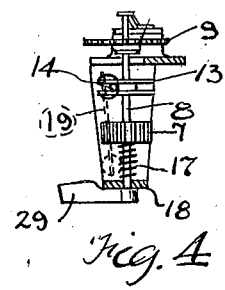
Fig. 4.
INVENTORS
Melchior Beller 2nd
Carl F. Bauer
BY
Fay, Oberlin & Fay
ATTORNEYS.

Patented Nov. 5, 1929

1,734,070

UNITED STATES PATENT OFFICE

MELCHIOR BELLER AND CARL F. BAUER, OF CLEVELAND, OHIO, ASSIGNORS TO THE DUAL SPEEDOMETER COMPANY, OF CLEVELAND, OHIO, A CORPORATION OF OHIO

SPEED-INDICATING MECHANISM

Application filed January 25, 1928. Serial No. 249,374.

Speed indicating devices, subject as they are to drastic usage, are prone in time through wear and misalignment to fail to register accurately at the zero point on return thereto. Also where a maximum indicating hand is provided as a part of the mechanism, failure in functioning thereof is not an uncommon occurrence, by reason of the severe jolting to which the devices are subjected, and the usually delicate character of the mechanism effecting such functions. A construction which will afford compensation so as to make possible accurate setting irrespective of such wear as may have occurred, and a reliably functioning hand control mechanism is fundamentally important and highly desirable.

To the accomplishment of the foregoing and related ends, the invention, then, consists of the features hereinafter fully described, and particularly pointed out in the claims, the following description and the annexed drawing setting forth in detail certain structure embodying the invention, this being illustrative however of but one of the various ways in which the principle of the invention may be employed.

In said annexed drawing:—

Fig. 1 is a face view of a speed indicating instrument in accordance with our invention; Fig. 2 is a similar view with the dial and hands removed; Fig. 3 is a similar view with the further removal of the odometer plate; and Fig. 4 is a sectional detail taken on a plane approximately indicated by the line IV—IV, Fig. 3.

Referring more particularly to the drawing, there is shown a casing 1 of any suitable form and character available for the protective mounting of the mechanism, and at the face thereof is a dial 2 bearing indicia in figures. A mounting bushing 3 provides for the mounting of the instrument and the attachment of the drive connection, for instance a flexible chain drive, as customary from a pinion mechanism arranged adjacent the road wheel. The main shaft 4 mounted in the speedometer casing then serves to transmit motion from such flexible drive on to the indicator mechanism, i. e. the rotatable shaft 4 thus transmitting motion to be indicated, in turn actuates means for translating such motion into an arcuate thrust. The detail of such translating means may vary considerably as effects the present invention, it being sufficient here merely to indicate one form of convenient embodiment, for example the centrifugal type, comprising paired weights 5 mounted to move a connected member in proportion to the throw of the weights, as determined of course in proportion to their speed of revolution, and such motion being communicated through a toothed sleeve 6 to a worm gear 7 on a spindle 8. This spindle carries a gear 9 which normally meshes with a pinion 10 on a second spindle 11, the latter carrying at its free end a pointer or running hand 12. Fixed on the spindle 8 is a grooved collar 13, in the groove of which there engages a pin 14 projecting eccentrically from the end of a stem 15, which is mounted through the casing and has on its outer end a thumb lever 16, capable of oscillating movement within a limited arc. A spring 17 is seated about the spindle 8 inside of the bracket 18. As will thus be seen, the spindle 8 is capable of being axially moved by the eccentric pin 14 in the grooved collar 13, on actuation of the thumb lever 16. Such movement as will be seen, unmeshes the gear 9 from the pinion 10; these being normally in mesh by reason of the spring 18. The stem 15 is provided with means for insuring retention in its respective oscillated positions, preferable means to this end comprising a leaf spring 19 bearing against squared surfaces on the stem.

Loose about the spindle 11, and back of the running hand 12, is another pointer or hand 20, this conveniently having a sleeve 21 mounted in the dial plate and having on its inner extremity a ratchet 22. The hand 20 is provided with a coil spring 23 which normally tends to hold it at zero position. With the movement of the running hand 12 across the dial however, engagement is had with the maximum hand, as for instance by a lug 24 projecting therefrom into the path of the running hand, thereby pushing the maximum hand along. Coacting with the ratchet 22 is a dog 25, this being in the form of a sturdily built lever capable of release, whereupon the coil spring 23 may return the hand to zero. For such release, the dog is extended as an integral lever, preferably in the form of a bell crank lever, pivoted as at 26 on the odometer plate or some convenient bracket in the casing. The other arm 25′ of the bell crank lever may project through a small opening therefor in the side of the casing or in the path of a push element 27 mounted through the casing. For maintaining the dog in normal position, a spring 28 may be suitably arranged.

As will be seen, from the foregoing; in operation, with the shaft 4 rotating as actuated by its connecting mechanism from the road wheel or the like, its rotary motion is translated through the centrifugal or other translating means into an arcuate thrust indicated by the running hand 12, and the position of such hand on the calibrated dial 2 will at all times be in proportion to the speed. As the hand 12 advances over the dial however, it will engage the lug 24 on the hand 20, and correspondingly push the latter hand also, but by reason of the dog 25 and ratchet 22, the hand 20 will be retained at its furthermost advanced position each time, and thus show the maximum attained, although the running hand 12 recedes back to zero as the speed correspondingly drops. Where it is desired to secure more permanent registration of any particular speed shown by the running hand 12, the thumb lever 16 is rocked to push the collar 13 and its spindle to position to unmesh the gearing 9, 10, whereby the hand 12 is immediately stopped at the position then occupied. A register of the actual running speed at the instant is thus had. To reset both hands to zero, the thrust element 27 is pushed, thus actuating the bell crank lever 25′, 25, the latter arm being thus raised from the ratchet and thereby releasing it, whereupon the coil spring 23 attached to the sleeve or bushing 21 of the hand 20 correspondingly throws the hand back, and since the lug 24 also engages the hand 12, the latter is likewise thrown back to zero position.

Through wear and the like, the actual position of the indicating hand when returned to zero may be somewhat inaccurate, and as a corrective for such conditions, the invention further provides a means for compensatively correcting to zero position. With the general construction shown, a convenient arrangement for this involves an adjusting compensator in connection with the release and reset gearing. With a lug 29 on the spindle 8, preferably in the form of a radial wing-lug, an adjusting abutment cooperative therewith is positioned in the path of the lug, conveniently a screw-threaded rod-abutment 30 mounted through the casing. The actual position of the lug 29, and thus of the spindle 8 and its gearing to the hands may thus be set through the medium of the takeup abutment 30, to the extent necessary to bring the hands to correct zero position.

Other modes of applying the principle of the invention may be employed, change being made as regards the details disclosed, provided the means stated in any of the following claims, or the equivalent of such, be employed.

We therefore particularly point out and distinctly claim as our invention:—

1. In a speed indicating device, the combination of a maximum hand, a casing enclosing the same, a manual lever operable from without the casing and extending as a dog for retaining said hand, and a spring for normally holding such dog in engagement to retain the hand.

2. In a speed indicating device, the combination of a maximum hand, a casing enclosing the same, means for retaining and releasing said hand, said means comprising a bell-crank lever having one arm extending as a dog for retaining said hand and the other arm affording a push-arm for release, and a spring for normally holding such dog in engagement to retain the hand.

3. In a speed indicating device, the combination of a maximum hand, a casing enclosing the same, means for retaining and releasing said hand, said means comprising a bell-crank lever having one arm extending as a dog for retaining said hand, and a push-element actuable to engage the other arm for release.

4. In a speed indicating device, the combination of indicator elements, means for resetting to zero, and means for correcting discrepancies in such setting.

5. In a speed indicating device, the combination of indicator gearing, means for controlling said gearing to reset to zero, and means for compensating discrepancies in such setting.

6. In a speed indicating device, the combination of a rotatable shaft adapted to transmit motion to be indicated, means for translating such motion into an arcuate thrust, said means including a spindle, gearing for turning said spindle, an index hand on said spindle, and means for compensating the position of said hand for correct zero.

7. In a speed indicating device, the combination of a rotatable shaft adapted to transmit motion to be indicated, means for translating such motion into an arcuate thrust, said means including a spindle, an index hand on said spindle, gearing for turning said spindle, means for engaging or disengaging said spindle gearing, and means for compensatively correcting the hand to zero.

8. In a speed indicating device, the combination of a rotatable shaft adapted to transmit motion to be indicated, means for translating such motion into an arcuate thrust, said means including a spindle, an index hand on said spindle, means for engaging and disengaging said spindle gearing, and means for compensatively correcting the hand to zero, said means including a lug on the spindle and an adjusting abutment movable into the path of said lug.

9. In a speed indicating device, the combination of a casing, a rotatable shaft adapted to transmit motion to be indicated, means for translating such motion into an arcuate thrust, said means including a spindle, an index hand on said spindle, gearing for turning said spindle, means for engaging or disengaging said spindle gearing, and means for compensatively correcting the hand to zero, said means including a radial lug on the spindle and a screw-threaded adjusting abutment extending through the casing into the path of said lug.

10. In a speed indicating device, the combination of a rotatable shaft adapted to transmit motion to be indicated, means for translating such motion into an arcuate thrust, said means including a spindle, gearing for turning said spindle, a running hand on said spindle, a maximum indicating hand loose about said spindle, means for interengagement whereby said running hand may push said maximum hand, gearing for turning said spindle, means for disengaging said spindle gearing, and means for compensatively correcting the hand-setting to zero.

11. In a speed indicating device, the combination of a rotatable shaft adapted to transmit motion to be indicated, means for translating such motion into an arcuate thrust, said means including a spindle, a second spindle, driving gearing therebetween, a running index hand on said second spindle, a maximum indicating hand loose about said spindle and adapted to be propelled forwardly by said running hand, means for engaging or disengaging said spindle gearing, and means for compensatively correcting the hand-setting to zero, said means including a lug on the first mentioned spindle and an adjusting abutment movable into the path of said lug.

12. In a speed indicating device, the combination of a casing, a rotatable shaft adapted to transmit motion to be indicated, means for translating such motion into an arcuate thrust, said means including a spindle, a second spindle, gearing therebetween, a running index hand on said second spindle, a maximum indicating hand loose about said second spindle and adapted to be propelled forwardly by said running hand, means for engaging or disengaging said spindle gearing, and means for compensatively correcting the hand-setting, said means including a radial lug on the first-mentioned spindle, and a screw-threaded adjusting abutment extending through the casing into the path of said lug.

Signed by us this 20th day of January, 1928.

MELCHIOR BELLER.
CARL F. BAUER.